United States Patent

[11] 3,589,577

| [72] | Inventor | Horace B. Basinger |
| | | 116 Mambrino Road, Oregon, Ohio 43616 |
| [21] | Appl. No. | 826,921 |
| [22] | Filed | May 22, 1969 |
| [45] | Patented | June 29, 1971 |

[54] ARTICLE CARRYING STAND FOR A MOTOR VEHICLE
9 Claims, 3 Drawing Figs.

[52] U.S. Cl. .................................................. 224/42.42, 108/44
[51] Int. Cl. .................................................. B60r 7/04
[50] Field of Search ......................................... 224/29, 42.11; 296/37; 206/19.5; 108/44, 45

[56] References Cited
UNITED STATES PATENTS
1,951,261 3/1934 Thompson .................. 206/19.5 UX
1,964,339 6/1934 Brassell ....................... 206/19.5
3,311,276 3/1967 Fromm ........................ 224/29

Primary Examiner—Robert G. Sheridan
Attorney—Hugh Adam Kirk

ABSTRACT: A generally rectangular support stand for a taxicab having a forwardly downwardly inclined frame or rack adapted to receive a two-way radio and a platform for a fare meter, supported by at least two pairs of longitudinally spaced floor-engaging legs having apertured feet, which pairs of legs may be adapted by a saddle to span a tunnel or hump in the floor of the front seat of the taxicab. These legs also support various other platforms, brackets, compartments, and trays on the stand for sundry articles and a light for use by a taxicab driver.

INVENTOR.
HORACE B. BASINGER
BY
Hugh A Kirk
ATTORNEY 3,589,577

ARTICLE CARRYING STAND FOR A MOTOR VEHICLE

BACKGROUND OF THE INVENTION

This invention relates to article-carrying stands which are adapted for supporting meters, two-way radios and the like in motor vehicles used as taxicabs and particularly to stands which are adapted to be mounted on a vehicle floor, such as over the hump or tunnel which often extends longitudinally along such floor over the transmission and drive shaft of the vehicle.

It is highly desirable for taxicab operators to have readily available a fare meter and two-way radio plus various and sundry articles, and heretofore the operator's compartment, including the dashboard and glove compartment, had to be modified for such radio and the fare meter.

SUMMARY OF THE INVENTION

A. Gist Of The Invention

Generally speaking, this invention comprises a rectangular support stand having at least two pairs of legs for supporting an inclined frame or rack and a horizontal platform for a taxi fare meter vertically spaced above the inclined rack. The base ends of at least some of these legs may be bridged by an upwardly projecting arch-shaped strap or saddle which may rest on the vehicle floor tunnel. This saddle and the other pair of legs may be provided with horizontally extending feet for attaching the stand by means of bolts to the floor of a motor vehicle. An intermediate horizontal platform is spaced between the meter platform and the rack and supports one edge of the meter platform, its opposite edge being supported by one of the legs. The area of this intermediate platform beneath the meter platform is provided with upstanding side and rear walls to form a compartment. This intermediate platform may be provided with a pocket at one of its corners for writing instruments, and an inclined bracket at another of its corners for hanging a radio microphone. One of the intermediate platform-supporting legs is provided with a substantially horizontal bracket intermediate this platform and the inclined rack for hanging a coin changer. Another leg may be provided with a vertical switch-mounting panel for an accessory light mounted on this intermediate platform. An open top box or tray is supported at each of its corners by the legs, beneath the inclined rack.

B. Objects and Advantages

An object of this invention is to provide an article-carrying stand for motor vehicles made of structural members which is adapted to be supported on the vehicle floor and over its hump, without modification of the vehicle's dashboard, glove compartment, or encroachment on the operator's space.

Another object of this invention is to provide a stand which is equipped with means for carrying a two-way radio, a fare meter, maps, trip records, writing instruments, lights, a table for writing, etc., in readily accessible and visible places, and also which prevents a third person from riding in the front seat of the vehicle adjacent the operator.

BRIEF DESCRIPTION OF THE DRAWINGS

The above-mentioned and other features, objects and advantages and a manner of attaining them are described more specifically below by reference to embodiments of this invention shown in the accompanying drawing, wherein.

DESCRIPTION OF THE PREFERRED EMBODIMENT

Figure 1:
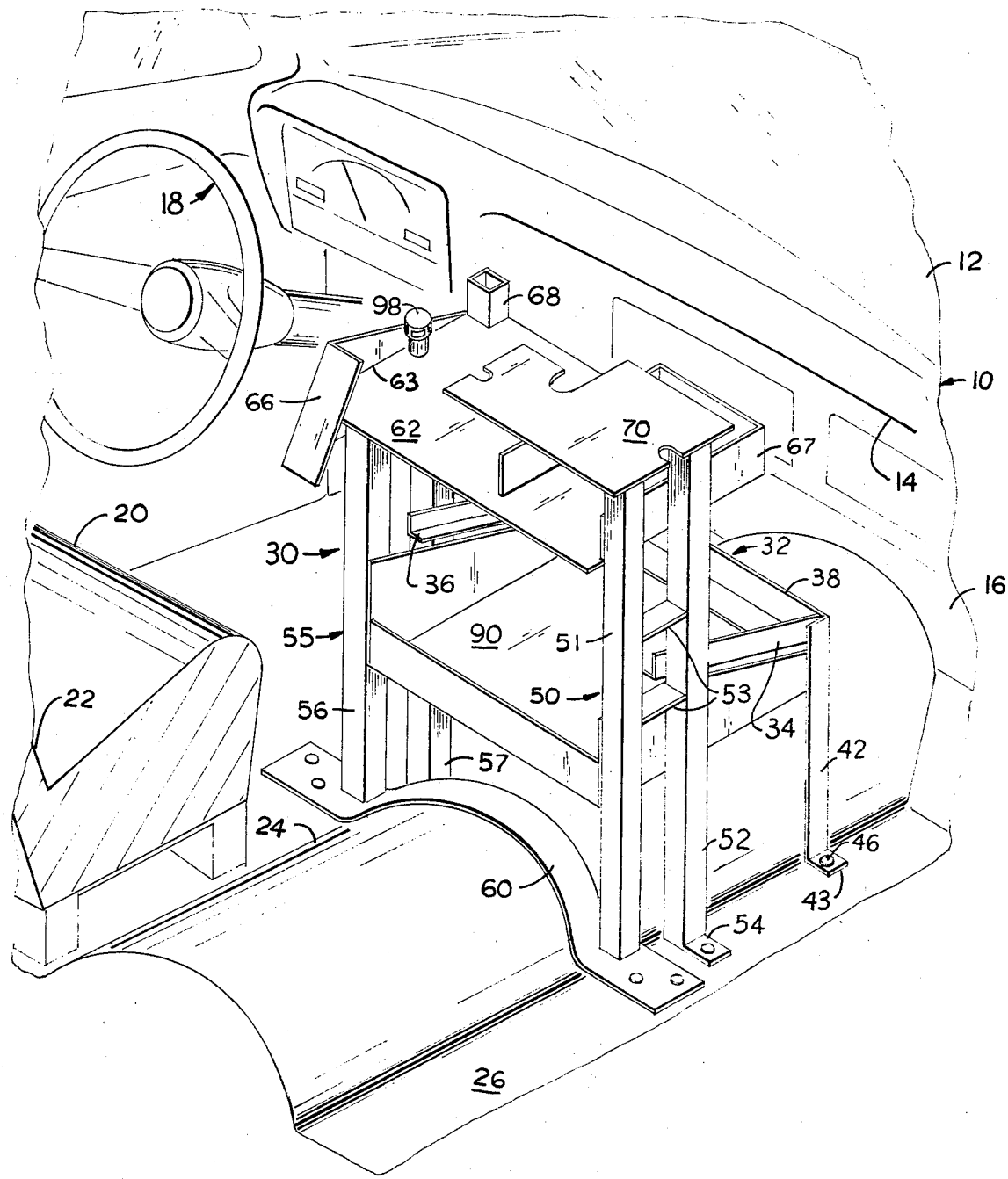
FIG. 1 is a partial perspective view of a front compartment of a motor vehicle, which is equipped with a stand constructed and installed according to this invention.

In FIG. 1 there is shown a portion of a front compartment of a motor vehicle having a body 10, a windshield 12, a dashboard 14, a firewall 16, a steering column and wheel 18, a front seat 20 having a back rest 22, and a transmission and drive shaft housing tunnel 24 which projects upwardly from a floor 26.

This invention resides in the provision of a generally rectangular support stand 30 which may be adapted to partially rest on, and which straddles the housing tunnel 24. This stand 30 is preferably made of flat plates and structural steel angle, channel, and/or tubular members, preferably welded together.

Figure 3:
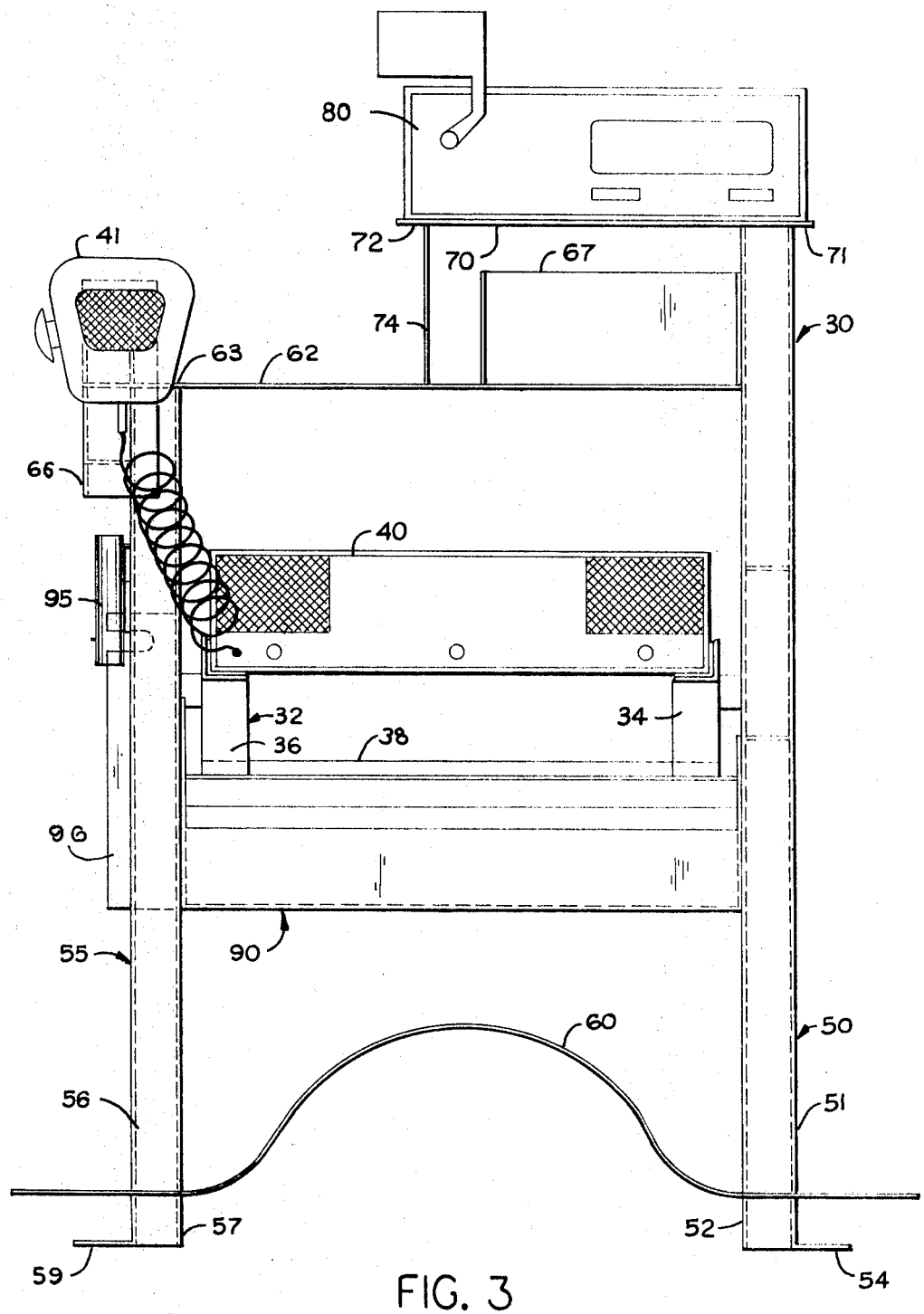
FIG. 3 is an enlarged front elevational view of the stand shown in FIG. 1 supporting a two-way radio and microphone, fare meter, and coin changer.

An important feature of this stand 30 comprises a forwardly downwardly projecting inclined frame or rack 32 which is defined by a pair of spaced parallel right angle side rails 34 and 36, and a transverse back rail 38. This frame or rack 32 is adapted to receive and support a two-way radio 40 (see FIG. 3).

A first pair of legs 42 and 44, each in the form of a solid flat strip, supports the forwardly downwardly projecting end of the frame or rack 32 at a predetermined level above the tunnel 24. The base end of each leg 42 and 44 is provided with a horizontally outwardly extending apertured foot 43 and 45, respectively, which may be detachably secured to the vehicle floor 26 by means such as bolts 46.

Figure 2:
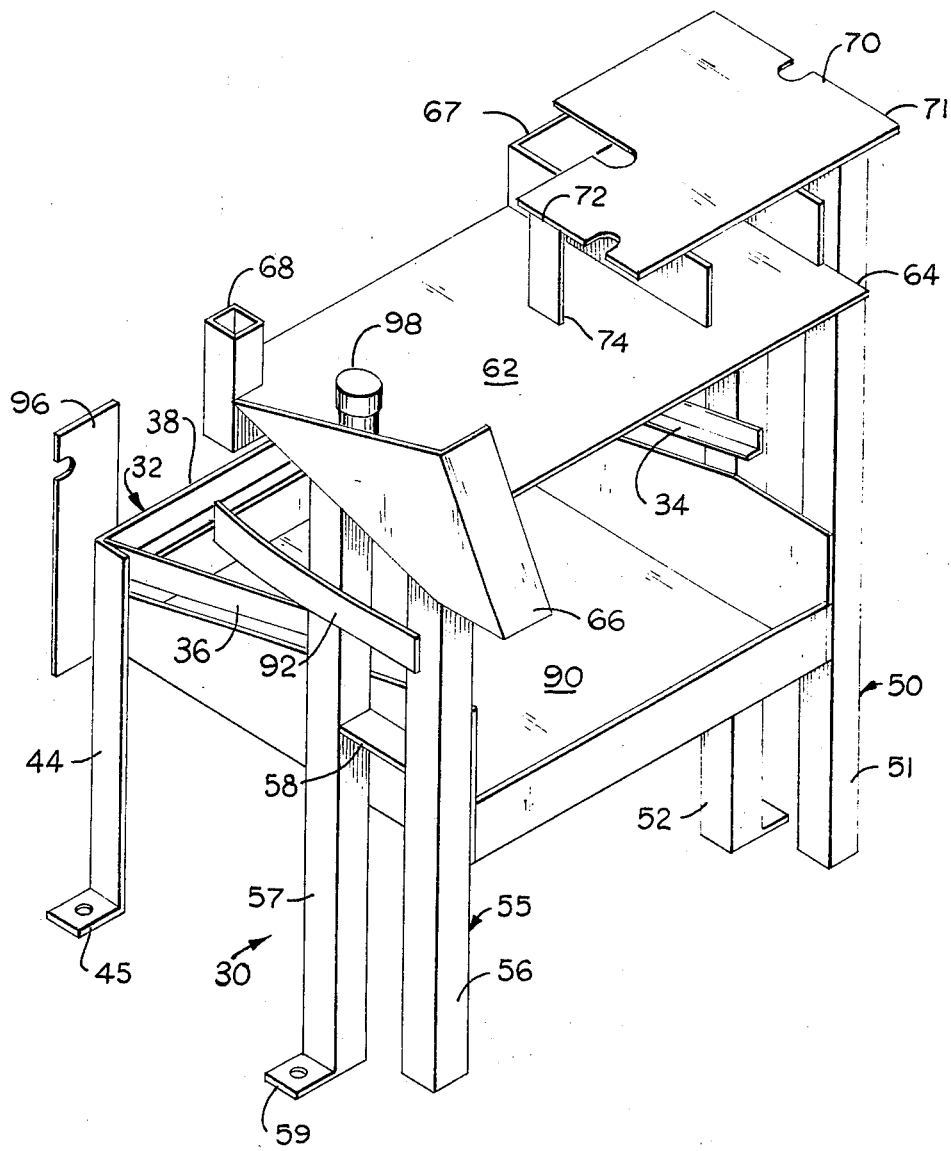
FIG. 2 is a perspective view of the other side of the stand shown in FIG. 1 without a hump or saddle strap.

Intermediate portions of a second pair of legs 50 and 55 support the open ends of the parallel side rails 34 and 36 of the rack 32 at a higher predetermined level above the tunnel 24. Each of these legs 50 and 55 may comprise a single member, or as shown in FIGS. 1 and 2, may include a pair of upright tubular leg members 51 and 52, and 56 and 57, connected together by tie members 53 and 58, respectively. The leg members 52 and 57 are each provided with a horizontally extending apertured foot 54 and 59, respectively, and are also detachably secured to the vehicle floor 26 in a similar manner as the feet 43 and 45 on the legs 42 and 44. The base ends of the upright tubular leg members 51 and 56 may be bridged by an arch-shaped strap or saddle 60 welded to the ends of the legs 51 and 56, which is formed to rest on the vehicle tunnel 24. Each end of this saddle 60 horizontally projects beyond its respective leg and is detachably secured to the vehicle floor 26 in a similar manner as are the feet of the other legs.

One edge 63 of a first horizontal or intermediate platform 62 which may serve as a table, is affixed to and overhangs the upper end of the leg 55 at a predetermined level above the inclined rack 32. The other edge 64 of the platform 62 is supported by an intermediate portion of the leg 50. The edge 63 of this platform 62 is provided with an L-shaped inclined bracket 66, which is adapted to hold a microphone 41 (see FIG. 3) connected by an extension cord to the two-way radio 40, and an upstanding receptacle 68 for holding writing instruments.

A second smaller horizontal or meter platform 70 disposed above the platform 62 supports a taxi fare meter 80 at a predetermined level above the vehicle floor 26. This platform 70 has one of its edges 71 supported by the upper end of the leg 50 and its opposite edge 72 supported by an upstanding leg 74 which rests on the platform 62.

The area of the platform 62 beneath this second platform 70 is provided with U-shaped rail 67 having side and rear walls to form a compartment for holding sundry articles.

An open top box 90 having each of its corners supported by the legs 42, 44, 50 and 55 is disposed beneath the inclined rack 32 for receiving other sundry articles, such as maps and trip records.

A substantially horizontal curved and tilted bracket 92 is secured to an intermediate portion of the leg 55 for hanging a coin changer 95 in close proximity to the vehicle operator but out of sight of any passengers in the vehicle.

Attached to the rear leg 44 is a vertical switch-mounting panel 96 which may be cut out to seat a switch for operating a light 98 mounted on the first platform 62, so that it can illuminate a map, trip records, or a pad for writing on the table portion of this platform 62. This light 98 also may have its switch mounted at its base, and the panel 96 may be used for mounting one or more switches to operate the lights in and outside the vehicle or taxicab, such as the "free" and "busy" sign lights, emergency flashers and other special lights used in the operation of a taxicab.

I claim:

1. A generally rectangular stand for installation between the dashboard and front seat on the floor of a passenger vehicle comprising:
   a. a plurality of legs each having a foot,
   b. means for attaching each said foot to the floor,
   c. a forwardly downwardly inclined radio-receiving rack disposed between and connected to two of said legs above the floor of the vehicle,
   d. a first horizontal platform disposed between and connected to two of said legs above said inclined rack, and
   e. a second horizontal platform spaced above and having one of its edges supported from said first horizontal platform and its opposite edge supported by one of said two legs.

2. A stand according to claim 1 including a saddle connected to and between two of said legs which saddle rests on the central longitudinal tunnel in the floor of the vehicle.

3. A stand according to claim 1 including a tray having at least side and rear walls supported by said two legs between the floor and said rack.

4. A stand according to claim 1 wherein a portion of said first platform beneath said second platform is provided with upstanding side and rear walls.

5. A stand according to claim 1 including a bracket attached to one of two of said legs for hanging a coin changer.

6. A stand according to claim 1, including an inclined bracket attached at an edge of said first platform for hanging a microphone for the radio.

7. A stand according to claim 1, including an upstanding receptacle attached to one corner of said first platform for holding writing instruments.

8. A stand according to claim 1, including a switch panel attached to one of said legs.

9. A stand according to claim 1, including a light mounted on said first platform for illuminating an adjacent portion thereof.